United States Patent
Carlsten et al.

(10) Patent No.: US 11,694,668 B2
(45) Date of Patent: Jul. 4, 2023

(54) SONOBUOY VOLUMETRIC ARRAY DEPLOYMENT MODULE

(71) Applicant: Raytheon Company, Waltham, MA (US)

(72) Inventors: Curtis B. Carlsten, Seekonk, RI (US); Frederick B. Koehler, Tucson, AZ (US); Jason E. Gaudette, Portsmouth, RI (US); Peter M. Willey, Rumford, RI (US)

(73) Assignee: Raytheon Company, Waltham, MA (US)

( * ) Notice: Subject to any disclaimer, the term of this patent is extended or adjusted under 35 U.S.C. 154(b) by 323 days.

(21) Appl. No.: 16/884,637

(22) Filed: May 27, 2020

(65) Prior Publication Data

US 2021/0375250 A1    Dec. 2, 2021

(51) Int. Cl.
*G10K 11/00* (2006.01)
*H04B 11/00* (2006.01)
*B63B 22/00* (2006.01)

(52) U.S. Cl.
CPC ............ *G10K 11/006* (2013.01); *H04B 11/00* (2013.01); *B63B 22/003* (2013.01)

(58) Field of Classification Search
CPC ............ B63B 22/003; B63B 2022/006; B63B 2241/02; G10K 11/006; G10K 11/008; G01V 1/20; G01V 1/201; G01V 1/8343; G01S 7/521; H04B 11/00; F03G 7/06145
USPC ......................................... 441/23, 33; 367/4
See application file for complete search history.

(56) References Cited

U.S. PATENT DOCUMENTS

| | | | |
|---|---|---|---|
| 3,539,979 A | 11/1970 | Crall | |
| 3,558,369 A | 1/1971 | Wang et al. | |
| 3,566,346 A * | 2/1971 | Scopatz | G10K 11/008 343/709 |
| 3,886,491 A * | 5/1975 | Jonkey | G10K 11/008 367/173 |

(Continued)

FOREIGN PATENT DOCUMENTS

| | | |
|---|---|---|
| JP | H0933640 A | 2/1997 |
| WO | 2019/129826 A1 | 7/2019 |

OTHER PUBLICATIONS

Invitation to Pay Additional Fees dated Feb. 10, 2022 in corresponding International Application No. PCT/US2021/027595.

*Primary Examiner* — Daniel V Venne
(74) *Attorney, Agent, or Firm* — Renner, Otto, Boisselle & Sklar, LLP

(57) ABSTRACT

A deployment module according to the present application enables both compact stowage of a sensor array and expansion of the sensor array into a three-dimensional volumetric array shape that enables improved directionality of the sensors during operation. The deployment module includes a support shell that is configured to retain a cable of the sensor array separately from sensors of the sensor array and an expandable deployment body formed of a superelastic shape memory alloy that uses superelasticity and stored energy for deployment of the sensor array. During deployment, the deployment body is removed from the support shell and the sensors are subsequently pulled out of the support shell. The deployment body then expands and holds the cable to retain the three-dimensional volumetric shape of the deployed array.

16 Claims, 5 Drawing Sheets

(56) References Cited

U.S. PATENT DOCUMENTS

| | | | |
|---|---|---|---|
| 5,091,892 A * | 2/1992 | Secretan | G10K 11/008 367/149 |
| 2002/0196707 A1 | 12/2002 | Kitchin et al. | |
| 2009/0207697 A1 | 8/2009 | Kitchin et al. | |

* cited by examiner

SONOBUOY VOLUMETRIC ARRAY DEPLOYMENT MODULE

FIELD OF THE INVENTION

The invention relates to a system and method of packing and deploying sensor arrays.

DESCRIPTION OF THE RELATED ART

Various applications may use sensor arrays. An exemplary sensor array includes a hydrophone array. A hydrophone array may be implemented in a sonobuoy that is dropped or ejected from an aircraft or a ship. The sonobuoy and the array may be dropped into an environment for acoustic observation. For example, the sonobuoy may be dropped in the ocean for underwater acoustic research. A sonobuoy may be used in military applications, such as in anti-submarine warfare. After the sonobuoy reaches the intended environment, the sensor array is deployed from the sonobuoy. During deployment, the sensor array may expand from a compacted structure to an expanded structure in which the sensor array is operable to perform the intended function, such as underwater surveillance.

Sonobuoys typically have a small size such that stowage and deployment of the hydrophone array presents challenges. Prior attempts to package and deploy hydrophone arrays include using rigid structures to support the shape of the array and external actuation devices such as motors, pumps and extra batteries. Using the rigid structures and external actuation devices may be a disadvantage for small-sized sonobuoys due to space constraints. Another disadvantage of using the rigid structures is that the structures provide limited deployment options for the sensors and thus limited directionality for the sensor array.

SUMMARY OF THE INVENTION

A deployment module according to the present application enables both compact stowage of a sensor array and expansion of the sensor array into a three-dimensional volumetric array shape that enables improved directionality of the sensor array during operation. The deployment module includes a support shell that is configured to retain a cable of the sensor array separately from sensors of the sensor array and an expandable deployment body formed of a superelastic shape memory alloy that uses superelasticity and stored energy for deployment of the sensor array. During deployment, the deployment body is removed from the support shell and the sensors are subsequently pulled out of the support shell. The deployment body then expands and holds the cable to retain the three-dimensional volumetric shape of the deployed sensor array.

The deployment module is modular in that a plurality of deployment sub-modules are axially stacked to form the deployment module. Each deployment sub-module includes a deployment body and a support shell. During deployment, the support shells are sequentially emptied of the sensors until all of the sensors are deployed. The deployment module may be vertically deployed such that the deployment sub-modules are deployed starting from an uppermost deployment sub-module and continuing until a lowermost deployment sub-module is deployed or vice versa.

The support shell may be formed using additive manufacturing and is formed to have spaced walls that define discrete slots for retaining the cable. Using the support shell prevents hockling or tangling of the cable during stowage and deployment. The shape of the support shell also positions each sensor on top of the walls by way of each sensor being seated after wrapping a segment of the cable in the walls until an open seat for a sensor is reached.

The deployment body may include a central hub and springs that are spirally wound around the central hub during stowage. One end of each spring is secured to the central hub. During deployment, the entire deployment body spins due to the superelasticity and stored spring energy of the springs, such that each spring is unwound and straightens radially outwardly to a normal shape of the spring. The extended end of the spring has an arm secured to the spring that engages the cable to maintain the shape of the sensor array.

The sensors of the sensor array may be formed using a micro inductive welding process. Clamshell portions are fused together to form a clamshell body that surrounds a flexible piezo element of each sensor. A plastic membrane is sealed onto the clamshell body to cover the piezo element. Using micro inductive welding enables a rapid sealing process that results in watertight, pressure tolerant, and precise sealing for the sensor electronics.

According to an aspect of the invention, a deployment module for a sensor array includes an expandable deployment body formed of a shape memory alloy.

According to an aspect of the invention, a deployment module for a sensor array includes a support shell configured to retain a cable of the sensor array separately from sensors of the sensor array.

According to an aspect of the invention, a deployment module for a sensor array includes a support shell having a plurality of spaced walls formed by an additive manufacturing process.

According to an aspect of the invention, a deployment module for a sensor array includes an expandable deployment body having a plurality of springs that are spirally wound during a stowage state.

According to an aspect of the invention, a sensor array includes a plurality of sensors that are formed by a micro induction welding process.

According to an aspect of the invention, a sensor array includes a plurality of sensors that include a flexible piezo element and a clamshell body that surrounds the piezo element.

According to an aspect of the invention, a sensor array includes a plurality of sensors that include a flexible piezo element, clamshell body portions that are fused together around the piezo element, and a polyethylene membrane that is sealed to the clamshell body to cover the piezo element.

According to another aspect of the invention, a deployment module for a sensor array having a plurality of sensors and a cable connecting the plurality of sensors includes a deployment body formed of a shape memory alloy that is expandable to hold the cable and retain a shape of the sensor array after deployment, and a support shell configured to support the sensor array and the expandable deployment body in a stowage state before deployment, the support shell having spaced walls configured to retain the cable separately from the plurality of sensors.

According to an embodiment of any paragraph(s) of this summary, the deployment body is formed of a superelastic material having stored spring energy when in the stowage state.

According to an embodiment of any paragraph(s) of this summary, the deployment body is spinnable to release the spring energy whereby the deployment body expands from a compacted shape to an expanded shape.

According to an embodiment of any paragraph(s) of this summary, the deployment body includes a central hub and a plurality of springs that each have a fixed end secured to the central hub.

According to an embodiment of any paragraph(s) of this summary, deployment body includes a plurality of arms that are secured to opposite ends of the plurality of springs relative to the central hub and are configured to engage the cable.

According to an embodiment of any paragraph(s) of this summary, the plurality of arms includes clamping portions to engage the cable.

According to an embodiment of any paragraph(s) of this summary, the central hub has a plurality of blades, wherein the fixed end of each of the plurality of springs is held between two adjacent blades of the plurality of blades.

According to an embodiment of any paragraph(s) of this summary, the spaced walls are formed to define discrete slots that each accommodate a segment of the cable corresponding to one of the plurality of sensors.

According to an embodiment of any paragraph(s) of this summary, the deployment module includes a plurality of deployment bodies and a plurality of support shells, wherein the plurality of support shells and the plurality of deployment bodies are axially stacked.

According to an embodiment of any paragraph(s) of this summary, the deployment module includes a central electro-mechanical cable that supports each of the plurality of deployment bodies.

According to an embodiment of any paragraph(s) of this summary, each of the plurality of sensors includes a flexible piezo element, a clamshell body that surrounds the piezo element, and a plastic membrane sealed onto the clamshell body over the piezo element.

According to an embodiment of any paragraph(s) of this summary, a sensor deployment module includes a sensor array including a plurality of sensors and a cable connecting each of the plurality of sensors, and each of the plurality of sensors includes a flexible piezo disc element, a clamshell body that surrounds the flexible piezo disc element, and a plastic membrane sealed onto the clamshell body over the flexible piezo disc element, an expandable deployment body that is configured to hold the sensor array in an expanded shape after deployment, and a support shell configured to support the sensor array and the expandable deployment body in a stowage state before deployment.

According to an embodiment of any paragraph(s) of this summary, each of the plurality of sensors includes a telemetry circuit card assembly supported by the clamshell body.

According to an embodiment of any paragraph(s) of this summary, the plastic membrane is formed of a polyethylene material and the clamshell body is formed of a thermoplastic material.

According to an embodiment of any paragraph(s) of this summary, each of the plurality of sensors includes radially outwardly cable terminations that are sealed to the cable.

According to still another aspect of the invention, a method of forming a sensor deployment module includes forming a sensor array having a plurality of sensors and a cable connecting the plurality of sensors using a micro inductive welding process, forming an expandable deployment body, forming a support shell using an additive manufacturing process, and arranging the sensor array and the expandable deployment body in the support shell for stowage before deployment.

According to an embodiment of any paragraph(s) of this summary, forming the sensor array includes fusing clamshell bodies together over a flexible piezo element to form an enclosed clamshell body for each of the plurality of sensors, sealing a plastic membrane onto the clamshell body over the flexible piezo element and sealing the cable to electro-mechanical cable terminations of each of the plurality of sensors.

According to an embodiment of any paragraph(s) of this summary, the method includes forming the support shell of a plastic material having spaced walls configured to retain the cable separately from the plurality of sensors, and forming the expandable deployment body of a shape memory alloy.

According to an embodiment of any paragraph(s) of this summary, the method includes forming a plurality of expandable deployment bodies and a plurality of support shells, and axially stacking the plurality of support shells and the plurality of expandable deployment bodies.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have particular application in systems used for sensing extremely large environments or environments that are not easily accessible. Examples of environments in which a sensing system or array may be used include underwater, air, and space. The deployment module and method disclosed herein may be used for packing and deploying sensors in a particular environment. Military applications, such as anti-submarine warfare, or non-military applications, such as underwater acoustic research applications, may be suitable applications. In an exemplary application, a sonobuoy that includes a hydrophone array having any size may be suitable, and more particularly, a small-size or "A-size" sonobuoy for deploying a hydrophone array may be suitable. The hydrophone array may be deployed into the ocean from any suitable platform, such as an aircraft, sea vessel, or land vehicle. The deployment module and method disclosed herein may be used with many other sensor systems, environments, and platforms.

Figure 1:
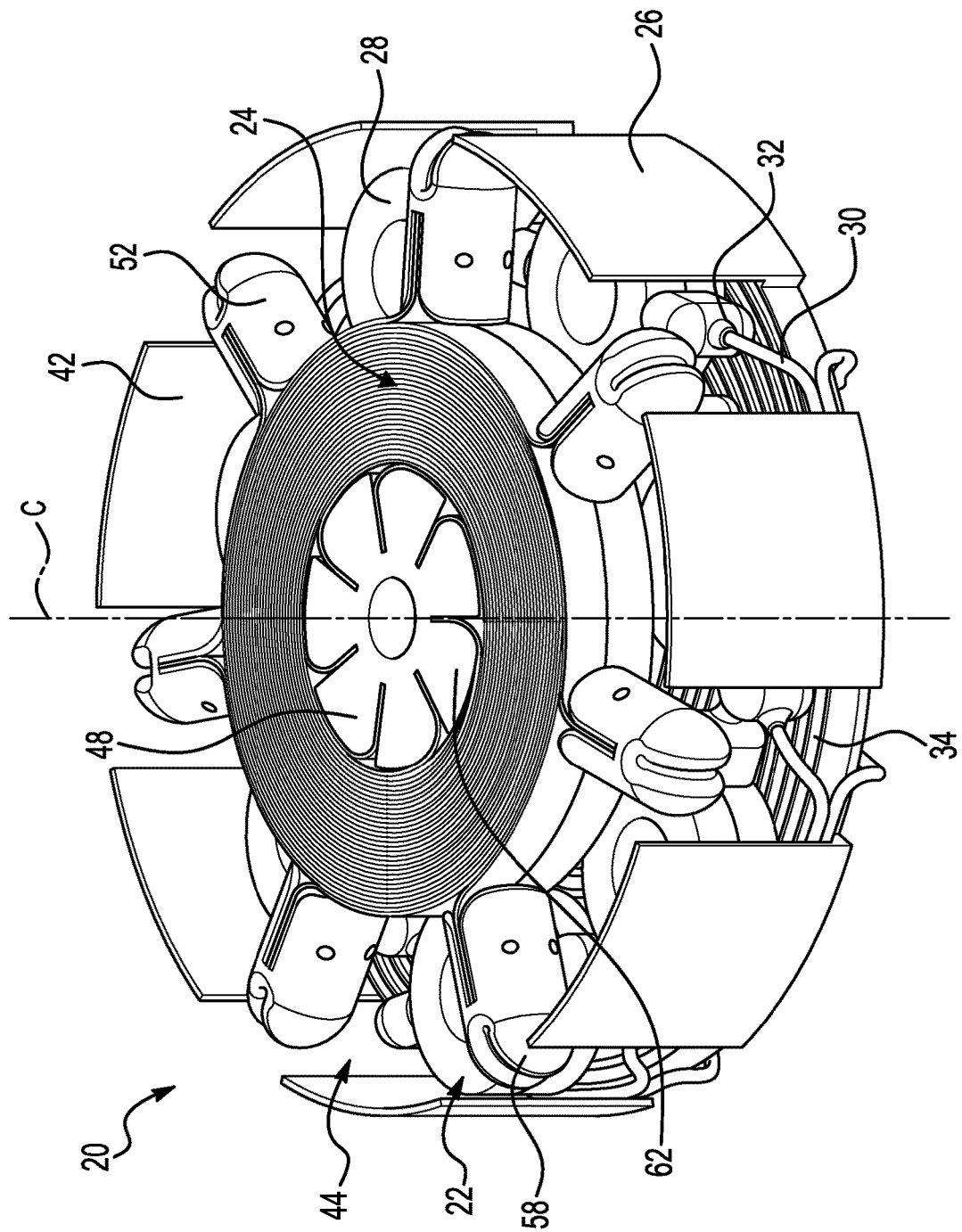
FIG. 1 shows an oblique view of a deployment module for a sensor array according to an exemplary embodiment of the present application.
Figure 2:
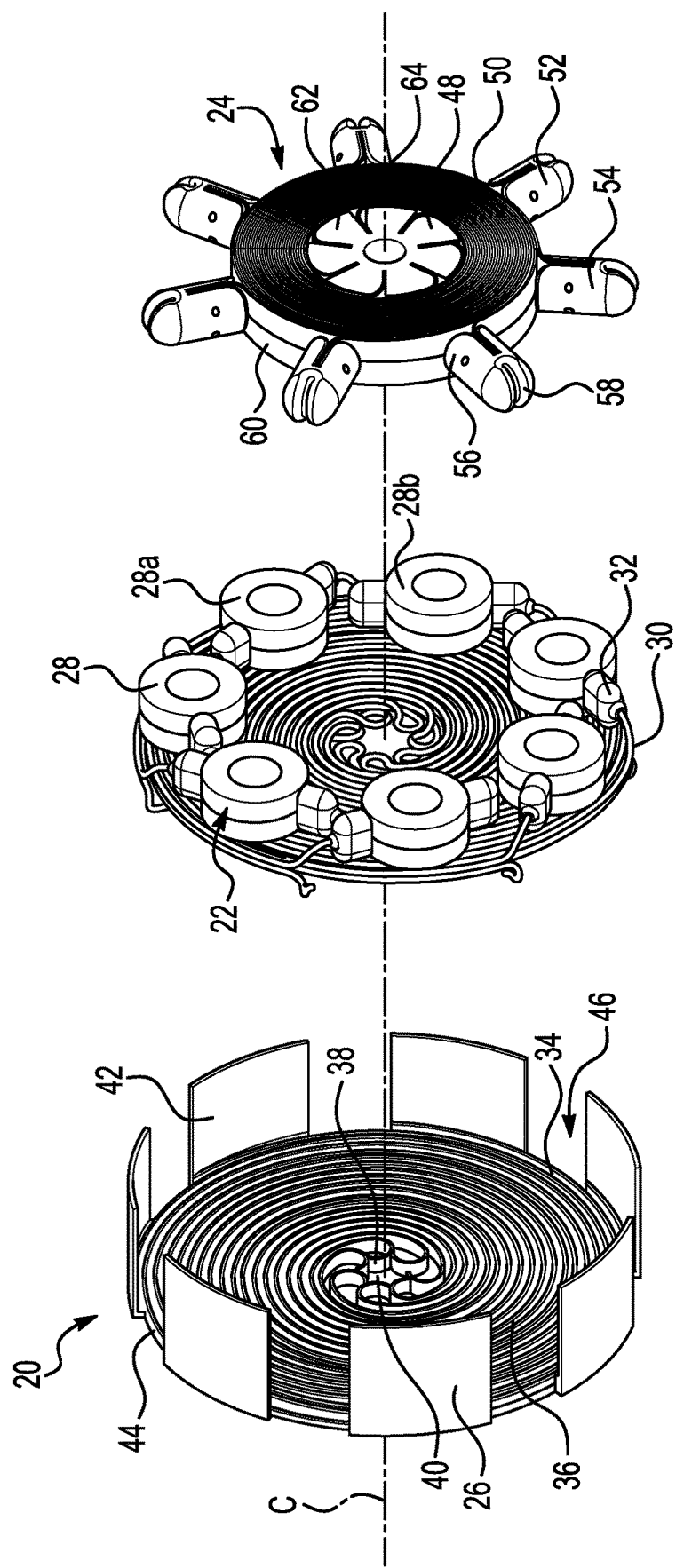
FIG. 2 shows an exploded oblique view of the deployment module of FIG. 1.

Referring first to FIGS. 1 and 2, a deployment module 20 for a sensor array 22 includes a deployment body 24 and a support shell 26. As shown in FIG. 1, the deployment module 20 has a stowage state in which the sensor array 22 and the deployment body 24 are supported in the support shell 26. The deployment body 24 and the sensor array 22 may be axially stacked in the support shell 26 along a central axis C. The deployment module 20 may be cylindrical in shape such that the central axis C is a longitudinal axis of the deployment module 20. Shapes other than cylindrical for the deployment module 20 may be suitable, such as spherical or rectangular, and the shape may be dependent on the application.

The sensor array 22 includes a plurality of sensors 28 and a cable 30 that connects the plurality of sensors 28 to form the sensor array 22. In an exemplary embodiment, the sensor array 22 may be a hydrophone array and the sensors 28 may be hydrophones, such as piezoelectric transducers. Other sensors may be suitable for the sensor array 22, such as other acoustic sensors or optical sensors. Sensors that are configured to detect other environmental characteristics may also be suitable. For example, suitable sensors include sensors that detect pressure, temperature, or depth or distance. Each sensor 28 is connected to an adjacent sensor by a segment or length of the cable extending between axial ends 32 of the sensors.

FIG. 2 shows an exploded view of the deployment module 20. The support shell 26 includes a plurality of spaced walls 34 that are configured to retain the cable 30 separately from the plurality of sensors 28 during the stowage state. The walls 34 are formed in a spiraled or leaved pattern. Discrete slots 36 are defined between the walls 34 and each discrete slot 36 accommodates a segment of the cable 30 that extends between two of the plurality of sensors 28. When retained in the walls 34, the cable 30 is nested in the walls 34. Each wall 34 may form a loop 38 proximate a center 40 of the support shell 26 that engages a corresponding loop of an adjacent wall 34, such that the support shell 26 has a plurality of loops 38 proximate the center 40. Using the support shell 26 is advantageous in preventing hockling or tangling of the cable 30 during both stowage and deployment.

A plurality of axially extending tabs 42 are formed on an outermost wall 44 and may be circumferentially spaced by recessed windows 46 about the support shell 26. The axially extending tabs 42 and the recessed windows 46 are used to provide access to the sensors 28, such as during packing the sensor array 22 into the deployment module 20. Any suitable manufacturing process and material may be used to form the support shell 26. The support shell 26 may be formed as an integral and monolithic body. An additive manufacturing process may be suitable to form the support shell 26. Other manufacturing methods, such as injection molding, may also be suitable. The support shell 26 may be formed of a plastic material. Other materials, such as other polymer materials or metal materials, may also be suitable. The materials may be dependent on the environment of an intended application for the deployment module 20.

The support shell 26 is further advantageous in positioning the plurality of sensors 28 during the stowage state and deployment. The sensors 28 may rest on top of the walls 34. The walls 34 are formed to accommodate a predetermined length of the cable 30 such that after a predetermined length of the cable 30 is inserted into a corresponding discrete slot 36 of the support shell 26, a sensor 28 at the end of the predetermined length of the cable 30 reaches an empty seat on top of the walls 34. The empty seat is adjacent another sensor 28 that was previously placed on top of the walls 34. The sensor 28 is then seated at the specific location on the plurality of walls 34 and another predetermined length of the cable 30 is inserted into another corresponding discrete slot 36 until the next empty seat for the sensor 28 is reached.

When seated on the walls 34, the sensors 28 are spaced by a predetermined distance and the sensors 28 may be held in position via the cable 30 being wrapped around the walls 34. The sensors 28 are placed independently and in succession such that a first sensor 28a is placed in the support shell 26, a segment of the cable 30 is inserted in a corresponding one of the discrete slots 36, another sensor 28b is placed on the support shell 26 adjacent the first sensor 28a, another segment of the cable 30 is inserted in another discrete slot 36, and so on. The placing of the sensors 28 and insertion of the cable 30 occurs alternately until the support shell 26 is fully accommodated.

The support shell 26 may be sized to accommodate any number of sensors 28 of the sensor array 22 and the number may be dependent on the application. Between five and ten sensors 28 may be supported by the support shell 26. Fewer than five and more than ten sensors may be suitable for other exemplary applications. The support shell 26 may be sized up or down for different applications. The size of the support shell 26 may be selected to accommodate a predetermined sensor array 22 using a minimal volume.

The shape of the support shell 26 may be formed to accommodate the sensors 28 in a one-by-one alignment such that each sensor 28 is arranged between two other sensors 28. In other embodiments, the support shell 26 may be formed to accommodate the sensors 28 in a two-by-two alignment in which a pair of sensors is adjacent two other pairs of sensors. When the sensors 28 are seated in the support shell 26, the sensors 28 may be uniformly oriented. As shown in FIGS. 1 and 2, the sensors 28 may have angled orientations relative to each other, such that a maximum number of sensors 28 are accommodated in the support shell 26. Other arrangements of the sensors 28 may also be suitable.

The deployment body 24 is expandable and is configured to deploy the sensor array 22 from the support shell 26 without using an external actuation device. The expansion may occur radially outwardly. The deployment body 24 expands via the material properties of the material of the deployment body 24. The material may be a superelastic shape memory alloy spring that retains spring energy during the stowage state. Due to the superelasticity of the shape memory alloy and the stored spring energy, the deployment body 24 is configured to expand from a contracted shape, as shown in FIGS. 1 and 2, to an expanded shape that is a regular or normal shape of the spring.

Using the self-contained deployment body 24 is particularly advantageous for small-sized sonobuoys in which space is constrained. The superelasticity of the shape memory alloy may be formed to achieve between 5 and 15% recoverable strain, as compared with conventional shape memory alloys that rely on externally applied joule heat for actuation. Thus, the deployment body 24 does not require additional activation devices for expansion. In other exemplary embodiments of the deployment body 24, such as in embodiments intended to be used in air environments, the shape memory alloy may be formed to activate in response to heat.

The deployment body 24 is configured to engage the cable 30 to hold the sensor array 22 in a deployed arrangement such that the expansion of the deployment body 24 may occur radially outwardly. The precise shape of the deployment body 24 is dependent on the application and many different shapes may be suitable. In an exemplary embodiment, the deployment body 24 may be cylindrical in shape. The cylindrical deployment body 24 may spin to expand from the contracted shape to the expanded shape, via the superelasticity of the shape memory alloy and the stored spring energy. The deployment body 24 may be formed of a central hub 48 and a plurality of springs 50 that are formed of the shape memory alloy.

Each spring 50 has an end secured to the central hub 48 and an arm 52 that is secured to an opposite end of the spring 50 relative to the central hub 48. The spring 50 may always have an end secured to the central hub 48 during stowage and when deployed. Each arm 52 includes a cable engaging end 54 that is opposite a spring securing end 56 at which the arm 52 receives the spring 50. The cable engaging end 54 may be formed of clamping portions 58 that engage the cable 30 for securing the deployment body 24 and the cable 30. The arm 52 may have any suitable shape. For example, the arm 52 may be cylindrical in shape.

In the stowage state, the springs 50 are spirally wound in two-dimensions about the central hub 48 to form a cylindrical shape and each arm 52 is circumferentially spaced about an outer peripheral surface 60 defined by the wound springs 50. The central hub 48 may be fan-shaped with a plurality of blades 62. Each spring 50 has a fixed end 64 that is held between adjacent blades 62. When the deployment body 24 is expanded, the fixed end 64 remains secured to the central hub 48 and the body of the spring 50 expands or straightens out such that the spring 50 moves to a normal or regular shape of the spring 50. The straight or unconstrained shape of the spring 50 holds the cable 30 that is engaged by the spring 50 in the three-dimensional shape. Other arrangements of the spring 50 may be suitable. For example, the deployment body 24 may be formed to have a single spring coil or counterrotating springs.

Figure 3:
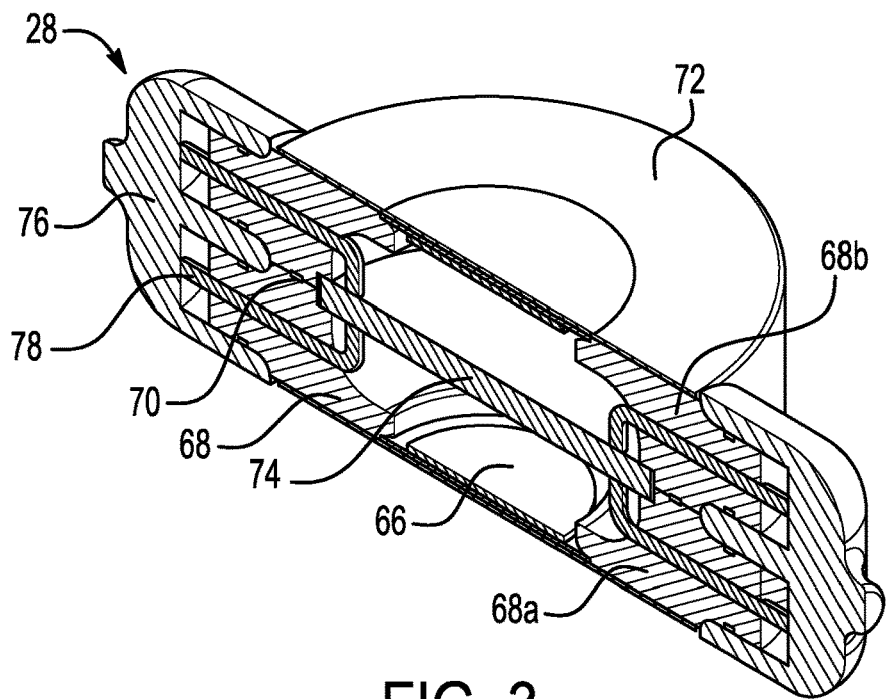
FIG. 3 shows an oblique view of a sensor assembly of the sensor array of FIG. 1 according to an exemplary embodiment.

Referring now to FIG. 3, an exemplary embodiment of the sensor 28 of the sensor assembly 22 is shown. The exemplary sensor 28 includes a flexible piezo element 66 for sensing acoustic energy. The piezo element 66 may have any suitable shape, such as a disc shape. Voltage of the sensor 28 is generated by straining the piezo element 66. The sensor 28 includes a clamshell body 68 formed of two clamshell halves or portions 68a, 68b that are fused together to surround the piezo element 66 in a compact arrangement. The clamshell body 68 may be formed of any suitable material for protecting the internal electronics of the sensor 28. An exemplary material includes thermoplastic.

The sensors 28 may be formed using any suitable manufacturing process. An example of a suitable manufacturing process includes micro inductive welding (MIW), such that a plurality of MIW susceptors 70 are formed between the clamshell portions 68a, 68b. A plastic membrane 72 is sealed onto the clamshell body 68 over the piezo element 66 to seal the sensor 28. Any suitable material may be used for the plastic membrane 72, such as a laminated polyethylene material. The plastic membrane 72 may have any suitable shape, such as a cylindrical shape. The arrangement of the sensor 28 is particularly advantageous in protecting the internal electronics of the sensor 28 using watertight and pressure resistant sealing that is provided by the MIW.

The sensor 28 may further include a telemetry circuit card assembly (CCA) 74 supported by the clamshell body 68 and connected to radially outwardly electro-mechanical cable terminations 76 of the sensor 28 via electrical connectors 78. The telemetry CCA 74 is used to provide data from the sensor 28 to a receiver that may be located remotely from the deployed sensor array 22. MIW susceptors may also be formed between the clamshell body 68 and the electro-mechanical cable terminations 76. The electro-mechanical cable terminations 76 are plugged into the clamshell body 68 and are each connected to the cable 30 for connecting each sensor 28 to the cable 30. Each sensor 28 may include two electro-mechanical cable terminations 76 that are mirrored on opposite sides of the sensor 28. Each electro-mechanical cable termination 76 supports both of the clamshell portions 68a, 68b. Using the electro-mechanical cable terminations 76 is advantageous in enabling the sensors 28 to lay flat in the support shell 26 while enabling the cable 30 to be routed into the discrete slots 36, as compared with conventional hydrophone arrangements in which the cable extends in an axial orientation.

Using MIW is advantageous in that the welding provides an effective seal between the elements in the sensor 28, such as between the clamshell portions 68a, 68b, between the plastic membrane 72 and the clamshell body 68, and between the clamshell body 68 and the cable 30. MIW is used to rapidly and precisely fuse materials via a non-contact method as compared with conventional sensor forming methods that include potting hydrophones and cables with thermoset urethanes or shrink tubes to seal against water intrusion. Using MIW also eliminates the need for additional sealing elements, such as o-rings.

Figure 4:
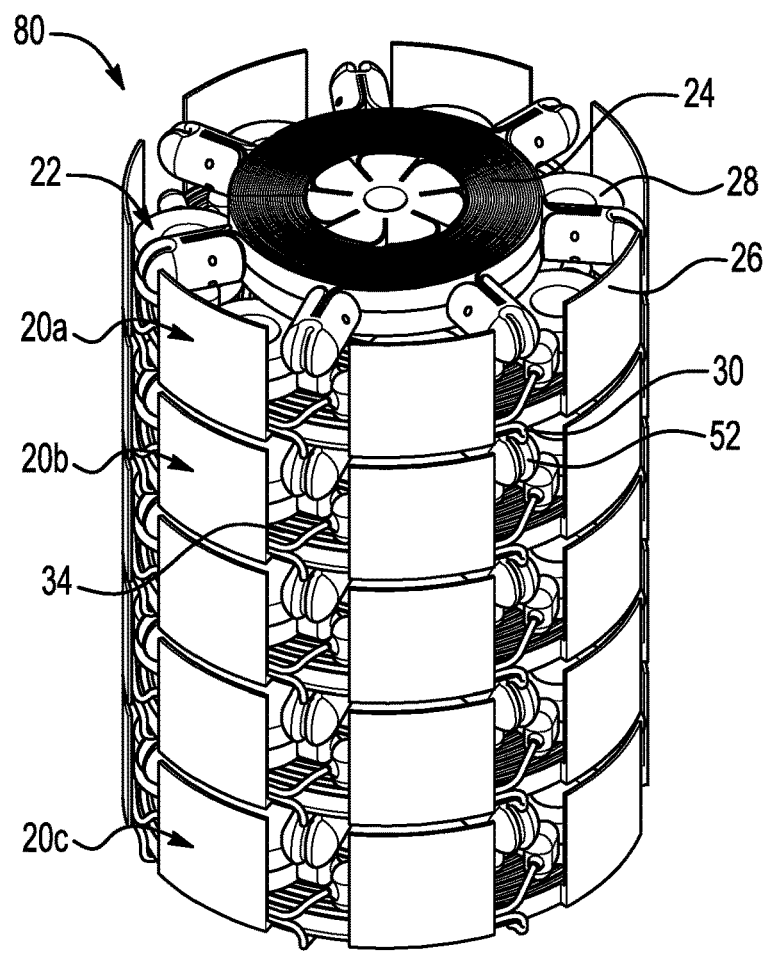
FIG. 4 shows a deployment module including a plurality of deployment sub-modules according to an exemplary embodiment of the present application.

Referring now to FIG. 4, a deployment module 80 includes a plurality of deployment sub-modules 20a, 20b, 20c that are axially stacked. Each deployment sub-module 20a, 20b, 20c may have the same features as the deployment module 20 shown in FIGS. 1 and 2. The deployment module 80 includes any number of deployment sub-modules 20a, 20b, 20c and the number of deployment sub-modules may be dependent on the application. Between four and ten deployment sub-modules may be suitable. Fewer than four and more than ten deployment sub-modules may be suitable in other applications. In an exemplary embodiment, the deployment module 80 may have a height that is between 25 and 101 centimeters (between 10 and 40 inches).

The number of deployment sub-modules may be selected based on the size of the sensor array 22 to be accommodated by the deployment module 80. Each deployment sub-module 20a, 20b, 20c includes a separate support shell 26 and each support shell 26 may be formed to have the same height and diameter. The deployment module 80 includes a plurality of deployment bodies 24 that each correspond to one of the deployment sub-modules 20a, 20b, 20c such that each deployment sub-module 20a, 20b, 20c is separately deployed in succession. FIG. 4 also shows each arm 52 of the deployment body 24 engaging a corresponding segment of the cable 30.

During deployment, the deployment sub-modules 20a, 20b, 20c are sequentially deployed and within each deployment sub-module 20a, 20b, 20c, the sensor array 22 is sequentially deployed. The deployment body 24 of a corresponding deployment sub-module 20a, 20b, 20c is first removed from the support shell 26 and the sensor array 22 is subsequently pulled out of the support shell 26. One of the plurality of sensors 28 is pulled out of the support shell 26, which is followed by pulling out a segment of the cable 30 from a corresponding one of the walls 34 of the support shell 26, which is followed by subsequently pulling out another sensor 28 arranged at the opposite end of the segment of the cable 30. The removal of the sensors 28 and the cable 30 from the support shell 26 continues in an alternating manner until the support shell 26 is emptied of the sensor array 22. In an exemplary application, using the deployment module described herein, three or more meters of cable 30 may be deployed per second.

When a support shell 26 is emptied, the support shell 26 of the corresponding deployment sub-module 20a, 20b, 20c may be displaced and the deployment body 24 of an axially adjacent deployment sub-module 20a, 20b, 20c is then deployed. In an exemplary embodiment, the support shell 26 may be displaced into the environment, or the support shell 26 may be recoverable for future use. The deployment sequence may continue for each deployment sub-module 20a, 20b, 20c until all of the deployment sub-modules 20a, 20b, 20c are emptied and the entire sensor array 22 is deployed. In an exemplary application, the deployment module 80 has a vertical orientation during deployment, such that an uppermost deployment sub-module 20a is first deployed and the remaining deployment sub-modules 20b, 20c are deployed until a lowermost deployment sub-module 20c is emptied. In other exemplary applications, deployment of the deployment sub-modules 20a, 20b, 20c occurs from the lowermost deployment sub-module 20c and continues upwardly to the uppermost deployment sub-module 20a.

Figure 5:
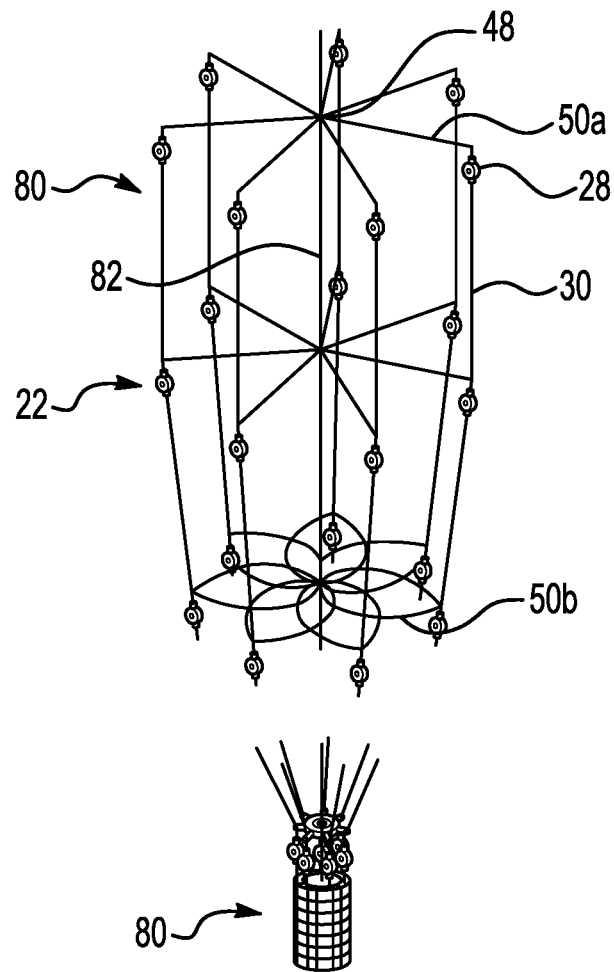
FIG. 5 shows the deployment module of FIG. 4 during deployment.

Referring now to FIG. 5, the deployment module 80 during deployment is shown. The sensor array 22 has a vertical orientation and a three-dimensional volumetric shape in which the sensors 28 are radially spaced. The deployed shape of the sensor array 22 may have a diameter that is between 15 and 25 times the diameter of the deployment module 80 when in the stowage state. The deployment body 24 is in the expanded shape in which springs 50a arranged at a deployed end of the deployment module 80 are straightened out relative to the central hub 48 and extend between the central hub 48 and the cable 30. The stiffness of the springs 50a being in their regular shape holds the segments of the cable 30 in the vertical orientation. The springs 50b at an opposite end of the deployment module 80 are shown during deployment in which the springs 50b are straightening out from the wound structure to move to the structure in which the springs 50a are shown. The cable 30 extends between all the sensors 28 of the sensor array 22 such that the cable 30 is continuous.

A central electro-mechanical cable 82 is provided as a strength member that retains an axial spacing of the central hubs 48 for each spring 50a, 50b. The central electro-mechanical cable 82 defines the central axis of the deployed sensor array 22. Power for the cable 30 may also be provided by the central electro-mechanical cable 82 via a portion of the cable 30 being connected to the central electro-mechanical cable 82. The central electro-mechanical cable 82 may extend an entire axial length of the deployed sensor array 22. Accordingly, using the deployment module 80 enables a three-dimensional volumetric arrangement that provides directionality of the sensors 24, as compared with a conventional line array or other sensor arrays that be limited in flexibility of the deployed shape for the sensor array. In an exemplary embodiment, after operation of the sensor array 22 is ceased, the entire deployment module 80 may be recoverable and able to be re-packaged and re-deployed.

Figure 6:
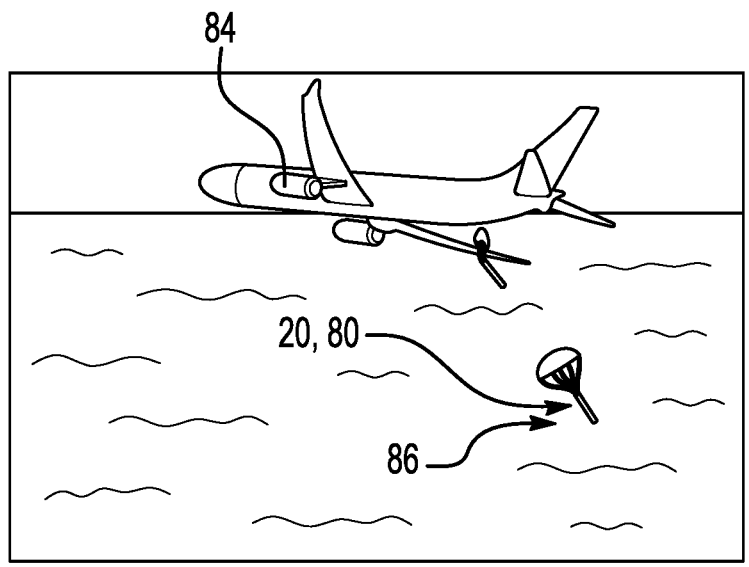
FIG. 6 shows an exemplary application in which a sonobuoy is delivered from a platform and includes the deployment module of FIG. 1.
Figure 7:
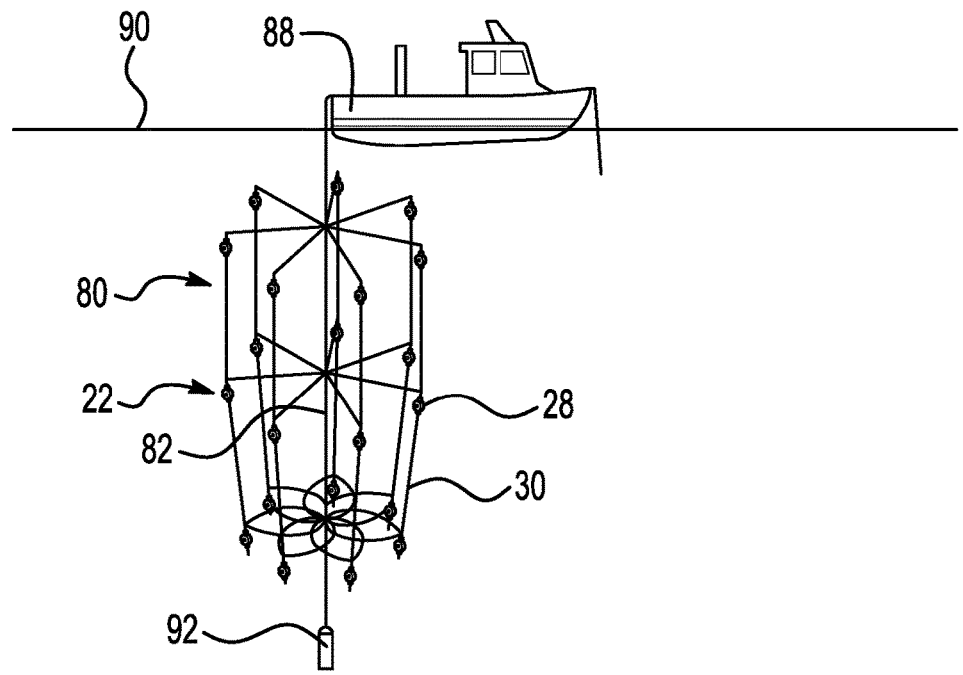
FIG. 7 shows an exemplary application in which the sensor array is deployed from the deployment module of FIG. 1.

Referring in addition to FIGS. 6 and 7, exemplary applications for the deployment modules 20, 80 are shown. FIG. 6 shows the deployment module 20, 80 being deployed from a platform 84 that is shown as an aircraft. In other exemplary applications, the platform 84 may be a sea vessel or land vehicle. The packing module 20, 80 may be arranged in a sonobuoy 86 that is deployed from the platform 84. FIG. 7 shows the deployment module 80 and the deployed sensor array 22 after deployment from a sea vessel 88, or after the packing module 20, 80 is deployed from an aircraft and connected to a sea vessel 88. After deployment, the sensor array 80 is a volumetric array such that the sensors 28 and the cable 30 are arranged in a vertically extending three-dimensional arrangement. The sensor array 22 is operable for the intended application when in the three-dimensional arrangement.

In an exemplary application, prior to the subsequent deployment of the sensor array 22, the sonobuoy 86 including the deployment module 20, 80 is deployed by the platform 84, such as the aircraft shown in FIG. 6, toward the water. A release mechanism may be provided for the initial release of the deployment module 20, 80 from the platform. A buoyant portion of the sonobuoy 86, or the sea vessel 88 if deployment of the deployment module 20, 80 occurs from the seal vessel 88, remains on the surface of the water 90 and a weighted portion 92 of the sonobuoy 86 is displaced and travels downwardly to deploy the sensor array 22 through the water, such that the deployment module 20, 80 is in a vertical orientation during and after deployment.

The weighted portion 92 or another bottom portion of the deployment module 80 may also include a battery pack to power the sensor array 22. The battery pack may be in communication with the central electro-mechanical cable 82 for supplying power to the cable 30. Electronics and radio may also be provided for processing data, such as telemetry data, that is received from the sensor array 22. The data may be communicated to the sea vessel 88 via the cables 30 through the central electro-mechanical cable 82 and up to a main control system located in the sea vessel 88. The control system receiving data from the sensor array 22 may be located proximate the sensor array 22 or remote from the sensor array 22.

Figure 8:
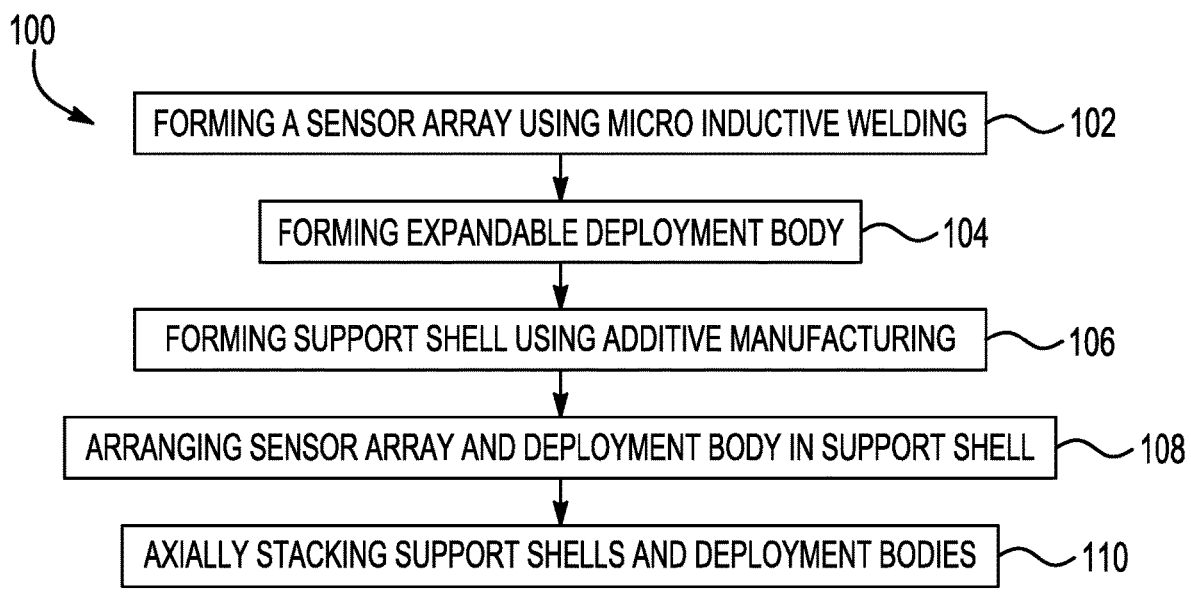
FIG. 8 shows a flowchart illustrating a method of forming a deployment module such as the deployment module of FIG. 1.

FIG. 8 shows a flowchart for a method 100 of forming a sensor deployment module, such as the deployment modules 20, 80 shown in FIGS. 1 and 4. Step 102 of the method 100 includes forming a sensor array 22 having a plurality of sensors 28 and a cable 30 connecting the plurality of sensors 28 using a micro inductive welding process. Step 102 may include fusing clamshell bodies 68a, 68b together over a flexible piezo element 66 to form an enclosed clamshell body 68 for each of the plurality of sensors 28, sealing a plastic membrane 72 onto the clamshell body 68 over the flexible piezo element 66, and sealing the cable 30 to electro-mechanical cable terminations 76 of each of the plurality of sensors 28 (shown in FIG. 3).

Step 104 of the method 100 includes forming an expandable deployment body 24 and step 104 may include forming the expandable deployment body 24 of a shape memory alloy. Step 106 of the method 100 includes forming a support shell 26 using an additive manufacturing process and step 106 may include forming the support shell 26 of a plastic material having spaced walls 34 configured to retain the cable 30 separately from the plurality of sensors 28. Step 108 of the method 100 includes arranging the sensor array 22 and the expandable deployment body 24 in the support shell 26 for stowage before deployment. Step 110 of the method may include forming a plurality of expandable deployment bodies 24 and a plurality of support shells 26, and axially stacking the plurality of support shells 26 and the plurality of expandable deployment bodies 24.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A deployment module for a sensor array having a plurality of sensors and a cable connecting the plurality of sensors, the deployment module comprising:
a deployment body formed of a shape memory alloy that is expandable to hold the cable and retain a shape of the sensor array after deployment; and
a support shell configured to support the sensor array and the expandable deployment body in a stowage state before deployment, the support shell having spaced walls configured to retain the cable separately from the plurality of sensors;
wherein the spaced walls are formed in a helical pattern and define discrete slots that each accommodate a segment of the cable corresponding to one of the plurality of sensors.

2. The deployment module according to claim 1, wherein the deployment body is formed of a superelastic material having stored spring energy when in the stowage state.

3. The deployment module according to claim 2, wherein the deployment body is spinnable to release the spring energy whereby the deployment body expands from a compacted shape to an expanded shape.

4. The deployment module according to claim 1, wherein the deployment body includes a central hub and a plurality of springs that each have a fixed end secured to the central hub.

5. The deployment module according to claim 4, wherein the deployment body includes a plurality of arms that are secured to opposite ends of the plurality of springs relative to the central hub and are configured to engage the cable.

6. The deployment module according to claim 5, wherein the plurality of arms includes clamping portions to engage the cable.

7. The deployment module according to claim 4, wherein the central hub has a plurality of blades, wherein the fixed end of each of the plurality of springs is held between two adjacent blades of the plurality of blades.

8. The deployment module according to claim 1 further comprising a plurality of deployment bodies and a plurality of support shells, wherein the plurality of support shells and the plurality of deployment bodies are axially stacked.

9. The deployment module according to claim 8, wherein each of the plurality of support shells has a same diameter that is between 10 and 13 centimeters and a same height that is between 2 and 6 centimeters.

10. The deployment module according to claim 8 further comprising a central electro-mechanical cable that supports each of the plurality of deployment bodies.

11. The deployment module according to claim 1 in combination with the sensor array, wherein each of the plurality of sensors includes a flexible piezo element, a clamshell body that surrounds the piezo element, and a plastic membrane sealed onto the clamshell body over the piezo element.

12. The deployment module of claim 1, wherein the shape memory alloy is a superelastic shape memory alloy.

13. The deployment module according to claim 1, wherein the support shell further comprises recessed windows.

14. A deployment module for a sensor array having a plurality of sensors and a cable connecting the plurality of sensors, the deployment module comprising:
a deployment body formed of a shape memory alloy that is expandable to hold the cable and retain a shape of the sensor array after deployment; and
a support shell configured to support the sensor array and the expandable deployment body in a stowage state before deployment, the support shell having spaced walls configured to retain the cable separately from the plurality of sensors;
wherein the deployment body includes a central hub and a plurality of springs that each have a fixed end secured to the central hub;
wherein the central hub has a plurality of blades; and
wherein the fixed end of each of the plurality of springs is held between two adjacent blades of the plurality of blades.

15. The deployment module according to claim 14, wherein the deployment body includes a plurality of arms that are secured to opposite ends of the plurality of springs relative to the central hub and are configured to engage the cable.

16. The deployment module according to claim 15, wherein the plurality of arms includes clamping portions to engage the cable.

* * * * *